United States Patent [19]
Gallagher et al.

[11] Patent Number: 5,486,254
[45] Date of Patent: Jan. 23, 1996

[54] DUAL DRIVE REGISTRATION SYSTEM

[75] Inventors: John E. Gallagher; Terence J. Gallagher, both of Brookfield, Conn.

[73] Assignee: Total Register, Inc., Brookfield, Conn.

[21] Appl. No.: 6,565

[22] Filed: Jan. 21, 1993

[51] Int. Cl.[6] .............................. B32B 31/00; B44C 1/16; B65H 23/18
[52] U.S. Cl. ............... 156/229; 156/64; 156/230; 156/234; 156/238; 156/351; 156/361; 156/494; 156/495; 156/540; 156/541; 226/27; 226/33
[58] Field of Search ...................... 156/361, 234, 156/494, 495, 540, 541, 351, 229; 226/27, 33; 242/75.44; 53/51

[56] References Cited

U.S. PATENT DOCUMENTS

| | | | |
|---|---|---|---|
| 3,115,999 | 12/1963 | Wythe | 53/51 |
| 3,454,447 | 7/1969 | Corbett et al. | |
| 3,673,418 | 6/1972 | Wiig | 53/51 X |
| 3,738,888 | 6/1973 | Williams | 156/541 X |
| 3,787,001 | 1/1974 | Henry | 53/51 X |
| 3,813,268 | 5/1974 | Kerwin | 156/361 X |
| 3,908,331 | 9/1975 | Donner | 53/51 X |
| 4,019,935 | 4/1977 | Harvey | 156/361 X |
| 4,214,937 | 7/1980 | Geurtsen et al. | 156/495 X |
| 4,248,655 | 2/1981 | Kerwin | |
| 4,728,377 | 3/1988 | Gallagher | 156/233 X |
| 4,795,513 | 1/1989 | Jensen, Jr. | |
| 4,984,458 | 1/1991 | Montgomery et al. | 226/27 X |
| 5,207,855 | 5/1993 | Nyfeler et al. | |
| 5,217,550 | 6/1993 | Takeuchi et al. | 156/361 X |

FOREIGN PATENT DOCUMENTS

| | | | |
|---|---|---|---|
| 0265208 | 4/1988 | European Pat. Off. | 226/27 |
| 876327 | 8/1961 | United Kingdom | 226/27 |

Primary Examiner—David A. Simmons
Assistant Examiner—M. Curtis Mayes
Attorney, Agent, or Firm—Majestic, Parsons, Siebert & Hsue

[57] ABSTRACT

A system of incrementally moving a foil, or other flexible and elastic elongated web, through a work station, by contacting and registering the foil on both sides of the work station. An example of such a work station is a hot stamping press that transfers optical images from the foil to other substrates. A drive mechanism, with an associated foil registration device, is provided at each of the entrance to the work station and the exit from it. Each registration device optically detects registration marks provided on the foil along its length, and is used to stop its associated drive mechanism after a predetermined number of marks have passed. This dual drive system maintains registration of the foil or other web throughout an extended work station. It is particularly advantageous for use with those hot stamping presses that either have a large number of die or whose multiple die are widely separated, since the multiple images carried along the foil are then all properly registered with the die.

12 Claims, 5 Drawing Sheets

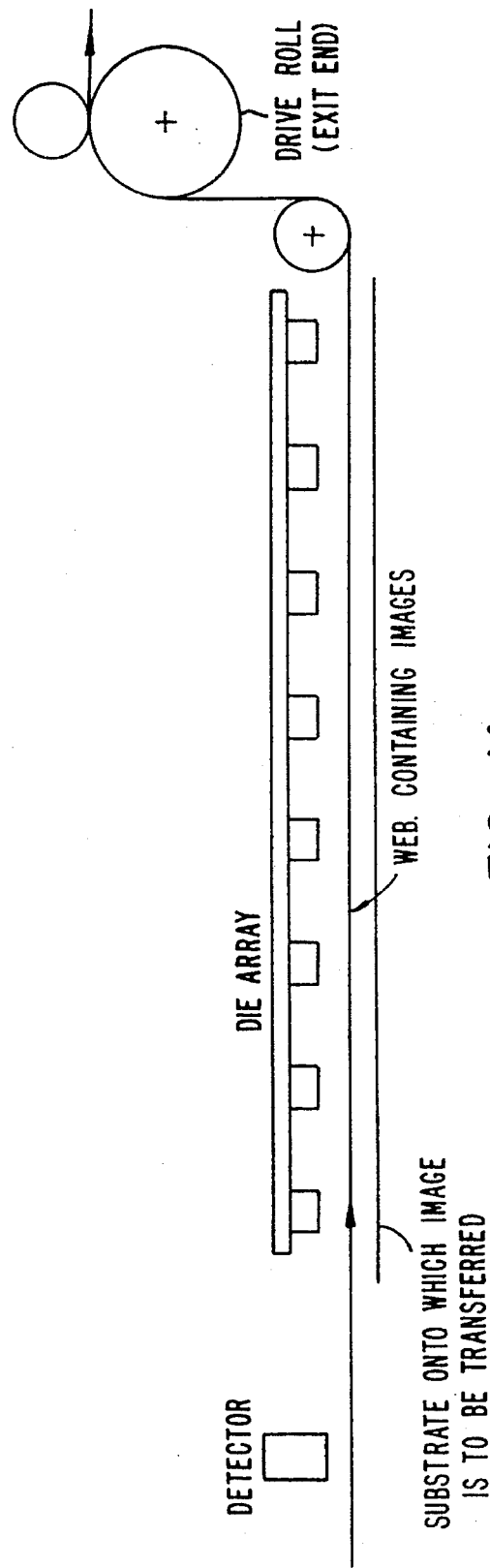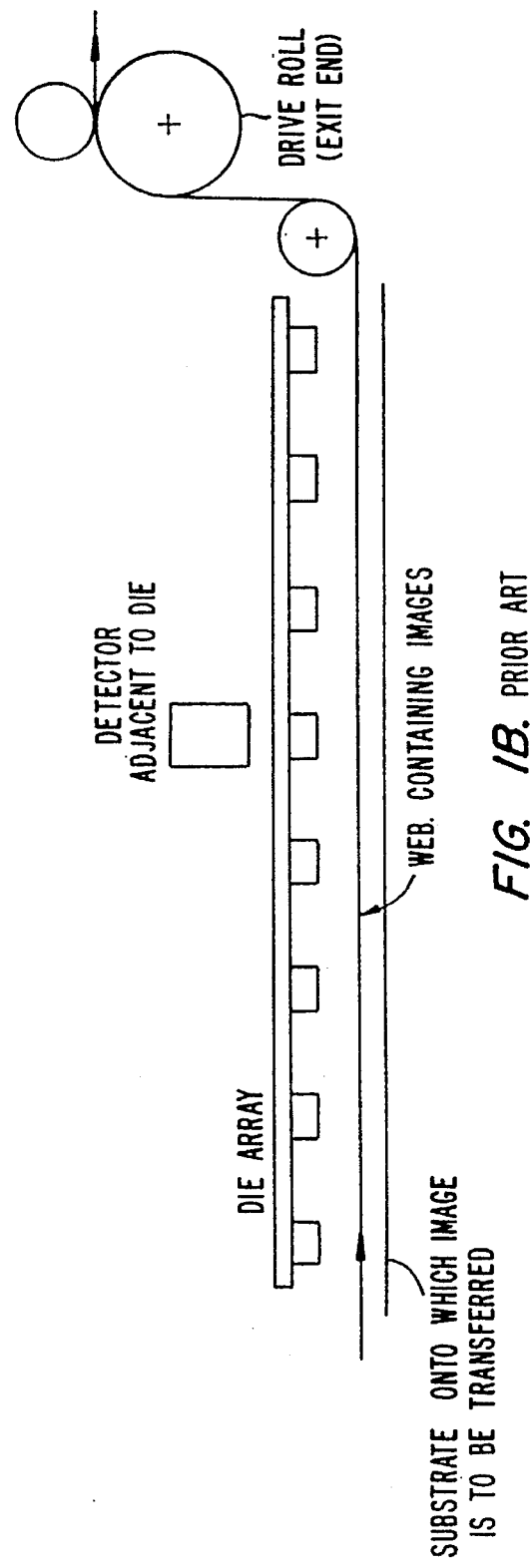

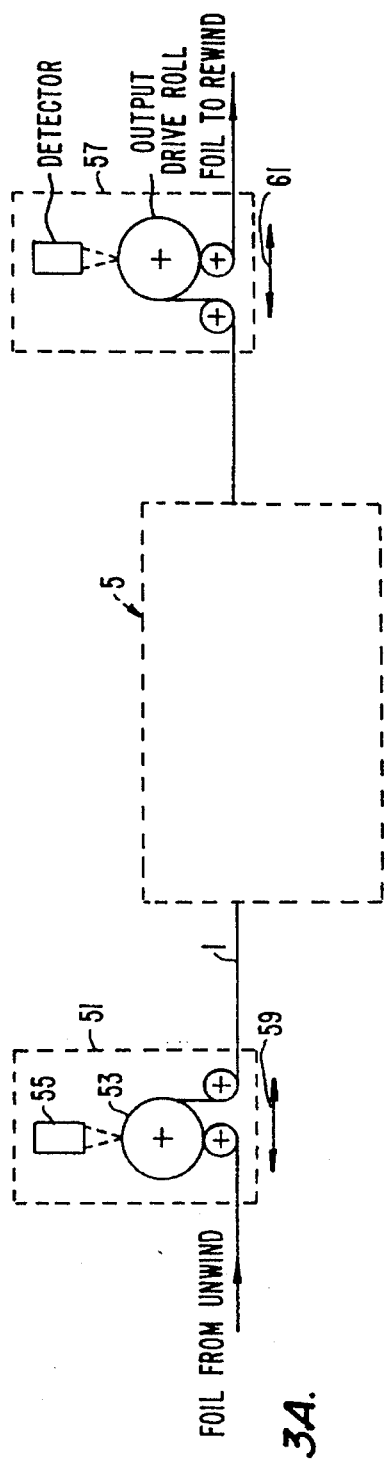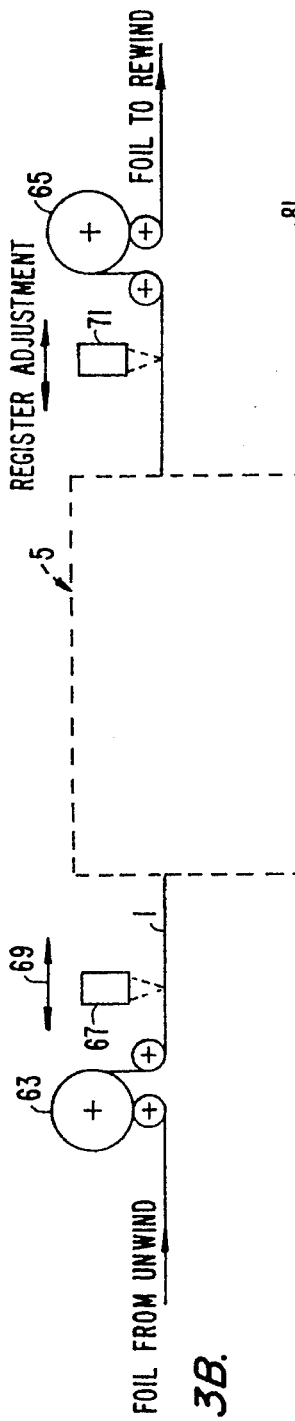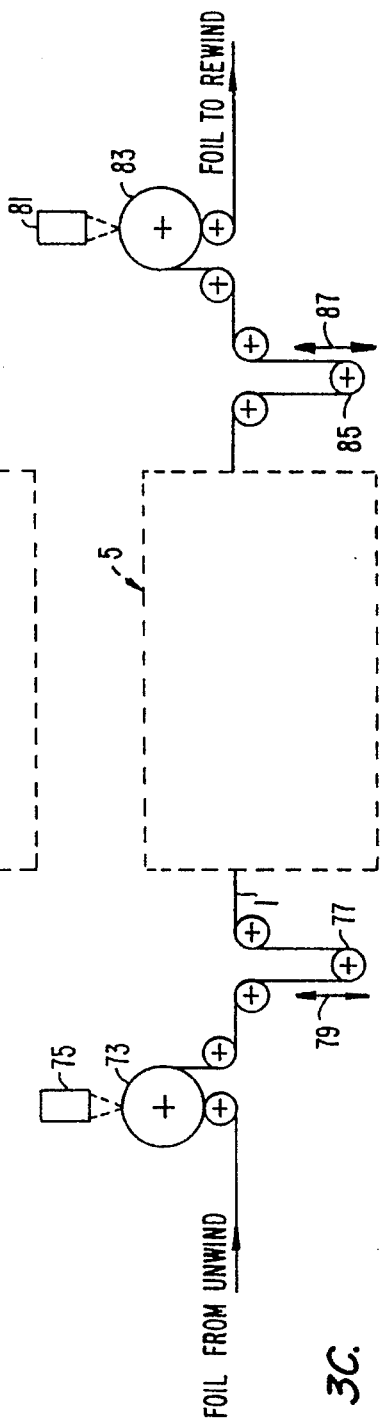

DUAL DRIVE REGISTRATION SYSTEM

BACKGROUND OF THE INVENTION

This invention relates generally to the art of aligning (registering) one article with another. More specifically, and by way of example, the present invention is directed to a method of registering multiple images along an elongated web with respective multiple transfer die of a hot stamping machine.

In a hot stamping operation, one or more portions of a hot stamping foil are transferred at one time to a substrate. In some applications, each transferred portion carries an optical image of some type that is desired to be placed on the substrate. An example of hot-stamping optically variable devices (OVDs), such as holograms is used, although clearly the problem and solution apply to many other continuous web registration applications.

Hot-stamping presses, such as are manufactured by Promeq Inc. and Bobst, are designed to transfer hot-stamping foil from continuous rolls of plain foil to various sheet substrates. In operation, a fixed die or die array causes one or more layers of the foil to be transferred to the substrate, as the substrate is pressed between the die and a reciprocating platen. These presses are normally used to transfer a section of the foil to the substrate to produce a pattern which is the shape of the die. Thus to transfer text, a die made in the shape of the desired text is used. Registration of the web with the die or die array is not an issue is this process, since there are no images on the web that need to be aligned with the individual die. The image is the die itself.

This type of press is now being used to transfer portions of foil along its length that contains images, such as holograms or other OVDs. An example is shown in U.S. Pat. No. 4,728,377—Gallagher (1988), which is incorporated herein by this reference. OVDs are now routinely produced in continuous web form on a hot stamping foil wherein they are nominally equally spaced on the web, each one having an associated registration mark. Various types of registration systems, notably those from Total Register Inc., are used to drive the web such that its stopping position places the OVD image in line with a transfer die, so that image is transferred from the web to the desired location on the substrate. This substrate, which is most frequently in sheet form, is typically either plastic, as in the case of the familiar credit cards; or paper, as in magazine covers such as National Geographic.

In the interest of clarity, in the discussions that follow, all references are to a single web system. In practice, multiple webs are used in parallel. Each of the multiple webs behaves independent of the others; therefore, the discussions apply equally well to multiple web systems.

Most of this stamping is done in a flat-bed hot-stamping machine using a single die such that one image is transferred for each cycle of the stamping press. In some cases multiple dies on the same web are used, but current registration systems do not provide sufficient accuracy over the long distances required to utilize large numbers of dies. Clearly, if multiple dies can be used, productivity will increase roughly in proportion to the number of dies. Current registration systems provide registration of the web at a single point for each impression. Two such existing arrangements are illustrated in FIGS. 1(a) and 1(b) herein. Therefore, registration accuracy at all other points is subject to variation in registration due to two factors: variation in spacing of the images along the length of the web due to web stretch during the web manufacturing process, and variation in spacing of the images due to web stretch during the hot stamping process.

Attempts to solve this inadequate registration to date have centered on improvements in the accuracy of web tension within the hot stamping press. While this has resulted in improvements, it has not proven to overcome the problem, since web tension is not the only contributor to web stretch. Other factors affecting elasticity play a significant part; notably the gauge (thickness) of the web, and the variation in modulus of elasticity as a function of temperature. This latter effect is surprisingly large. It is quite conceivable that there are sufficient temperature variations within a typical hot stamping press to cause the modulus of elasticity to vary by a factor of two. Thus, for a given web tension, the amount of stretch can vary by a factor of two.

These effects are of no significance in a well designed registration system when only one die is being used. Nor are they significant where a small number of dies are being used, or when image position tolerances are large. They become extremely significant, however, when attempting to hot-stamp OVDs on such things as bank notes, where the large sheet sizes inherently have large distances from the first die to the last, and the images are so small that very slight errors in registration are very obvious to the unaided eye. To some extent it is desirable to make register requirements difficult in order to deter counterfeiting.

Therefore, it is a primary object of the present invention to provide a technique of controlling a web such that registration between the web images and a hot stamping die array is maintained over large distances, despite long-term variations in pitch and elasticity of the web material.

It is a more general object of the present invention to provide a technique for accurately aligning and registering each of multiple locations along the length of an elastic web with a plurality of fixed positions.

SUMMARY OF THE INVENTION

These and additional objects are accomplished by the present invention wherein, briefly and generally, at least two registration detectors are provided at spaced apart locations along the path of movement of the web through the fixed positions. A mechanism is provided to move the web, in response to the detector outputs, so that it is properly aligned with at least two such spaced apart locations. The result is to overcome the mis-registration that can occur, when only one detector is used, at those fixed positions removed from the detector on account of variations of the amount of stretch that occurs for the reasons given above.

In a specific implementation of the invention that is described below, a hot stamping machine is provided with a web drive at the entrance end of the die array, and a second drive at the exit end of the die array. Each of these two drives has its own registration mark detector. In the simplest embodiment, each of the two drives is started simultaneously, and each will drive until a registration mark is detected at each of the detector locations. Thus registration is attained at two widely separated points on the web, resulting in accurate registration at all points in between. Therefore, if the spacing of the OVDs carried by the web is constant between the two detectors, then the registration is accurate throughout the die array regardless of temperature or material cross-section. Variations in OVD pitch caused by variations in web tension during the manufacture of the web, however, usually occur over relatively long distances and, therefore, do not cause registration errors. The techniques of the present invention, therefore, eliminate registration errors due to variations in material thickness, material width, and temperature, as well as those from long-term pitch errors.

BRIEF DESCRIPTION OF THE DRAWINGS

FIGS. 1(a) and 1(b) show examples of prior art web registration techniques in hot stamping machines;

FIGS. 3(a), 3(b) and 3(c) show variations of the embodiment of FIG. 2;

DESCRIPTION OF THE PREFERRED EMBODIMENTS

Figure 2:
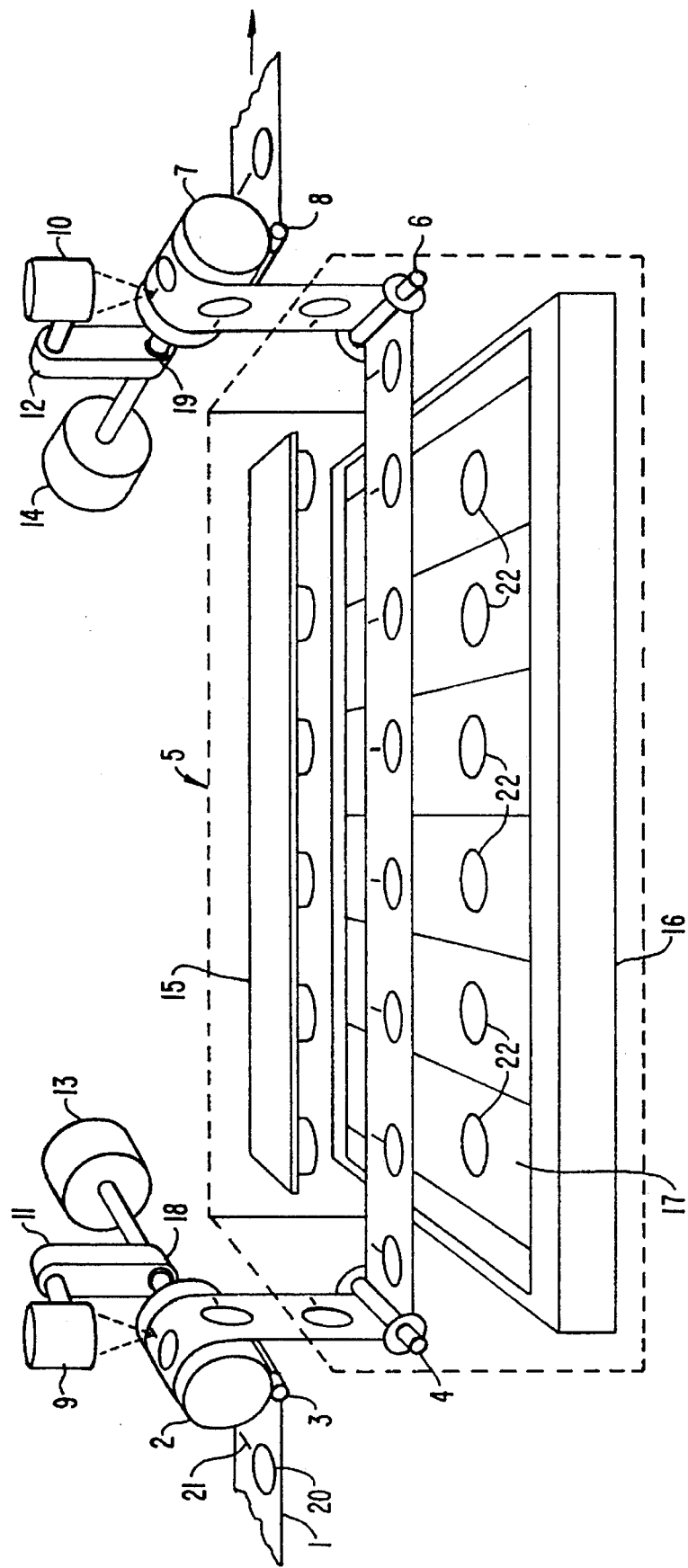
FIG. 2 illustrates the improved registration technique of the present invention incorporated in a hot stamping machine.

Referring to FIG. 2, an elongated web 1 carries a foil containing OVD images 20 and registration marks 21 periodically spaced along its length. The web 1 is unwound from a supply roll (not shown), threaded through an input drive roll 2 and a nip roll 3, around an input guide roll 4, through the body of a conventional hot-stamping press 5, such as previously described, around an output guide roll 6, through an output drive roll 7 and a nip roll 8, and is rewound on a rewind roll (not shown). The input drive 2 is driven by a motor 13, and the output drive 7 independently by a motor 14.

The center-to-center distance of the OVD images 20 in the relaxed state is made to be slightly less than that of the die array. As the press 5 is operated, a signal from the press initiates the web drive system. On receipt of this start signal, the input drive roll 2 starts to drive the web 1. After a predetermined amount of movement of the input drive roll 2 sufficient to cause the foil to go slack, the output drive roll 7 is started. This delay in the output drive, while not an essential part of the invention, greatly assists in the tracking of the foil through the apparatus. The input drive roll 2 continues to drive the web 1 at the point of its engagement with the web until the correct registration mark 21 is sensed by its associated input detector 9, and the output drive roll 7 continues to drive the web 1 at the point of its engagement with the web until the correct registration mark 21 is sensed by its associated detector 10. The web is thereby stretched from its original state, in which the center-to-center distance between OVDs was less than that of the die array 15, to a new state in which it matches the center-to-center distance of the dies. This matching of center-to-center distance takes place regardless of material gauge, dimensions, or modulus of elasticity.

The determination of which registration mark to sense as the stopping position is a complex one, not forming a part of this invention. In the simplest case for the configuration shown, the foil must be advanced by six OVD pitches after each stamping operation in order to align a new set of images.

As the press is cycled, vertically reciprocating platen 16 forces a substrate 17 and foil 1 against the heated die array 15, causing image portions of foil 1 to become transferred to the desired locations 22 on a substrate 17. The substrate 17 is usually in the form of a large sheet that is later cut into the individual documents or other articles shown but can alternatively be in the form of individual documents during the hot stamping operation. Running adjustments can be made to the positions of the input and output detectors, such that the array of images within the press body area are stretched to match the die array, both in center-to-center distance and in absolute position. The images are thereby transferred to the correct locations 22, on the substrate 17. Such changes in center-to-center distance of the OVDs 20 are accomplished by moving the detectors 9 and 10 together in opposite directions in arcuate paths about respective axes of rotation of the drive rolls 2 and 7. A rotary arm 11 containing a bearing 18 allows the detector 9 to move around drive roll 2 without changing its distance from the foil. A similar arm 12 and bearing 19 performs the same function with the detector 10. The arms 11 and 12 may be rotated manually or, preferably, by means of a small electric motor (not shown). Rotation of one or both of the detectors affects the amount of stretch of the web 1, and registration of its OVDs 20 with the die of the array 15. In the embodiment of FIG. 2, neither the entrance drive system (roller 2 etc.) nor the exit drive system (roller 7 etc.) is moved with respect to the hot stamp press in order to adjust the registration.

Although the system of FIG. 2 utilizes a preferred registration adjustment technique, there are alternate ways to adjust registration, within the scope of the invention, examples of a few of them being given in FIGS. 3(a), 3(b) and 3(c). Referring to FIG. 3(a), an input drive system 51 includes a drive roller 53 and an associated registration mark detector 55. A similar structure is provided as an output drive system 57. The detector 55 is, in this case, fixed with respect to the axis of the drive roller 53. Registration is adjusted by moving the entire input drive mechanism 51 back and forth, by use of an appropriate mechanical shuttle or the like, as indicated by an arrow 59. Similarly, the output drive mechanism 57 is made to be adjustable back and forth as indicated by an arrow 61.

In FIG. 3(b), an input drive roller 63 and an output drive roller 65 move the foil 1 through the hot stamping press 5. Rather than being associated with the input roller 63, however, an input registration mark detector 67 is positioned in between the fixed input roller 63 and the hot stamp press 5. Registration is adjusted by moving the detector 67 back and forth in a direction indicated by an arrow 69. Similarly, a detector 71 is provided adjacent the output of the hot stamp press 5.

Alternatively, the detectors of FIG. 3(b) may be located elsewhere along the path of the web 1, such as on sides of the output rollers 63 and 65 removed from the press 5. The detectors, or light gathering optics for the detectors (such as optical fibers), may also be located within the die array 15 of the press 5. The detectors should, in this latter case, be separated by one or more of the die in the array 15.

Another variation shown in FIG. 3(c) is similar to that of FIG. 3(a) in that input drive mechanism includes a roller 73 and associated detector 75. Rather than moving the entire input drive mechanism, as is done in the embodiment of FIG. 3(a), an adjustable roller 77 is provided in the path of the foil 1. The roller 77 is moveable in its entirety in a direction indicated by an arrow 79 to adjust the path length of the foil between the input detector 75 and a corresponding detector 81 provided as part of the output drive mechanism. Of course, the output drive mechanism includes a drive roller 83. Another adjustable roller 85 may be provided adjacent the output of the press 5, being moveable back and forth in a direction indicated by the arrow 87. Thus, it can be seen that there are many ways to use the dual drive, dual detector techniques of the present invention to adjust and control the amount of stretch to which the foil 1 is subjected to through the hot stamp press 5 during its operation.

Figure 4:
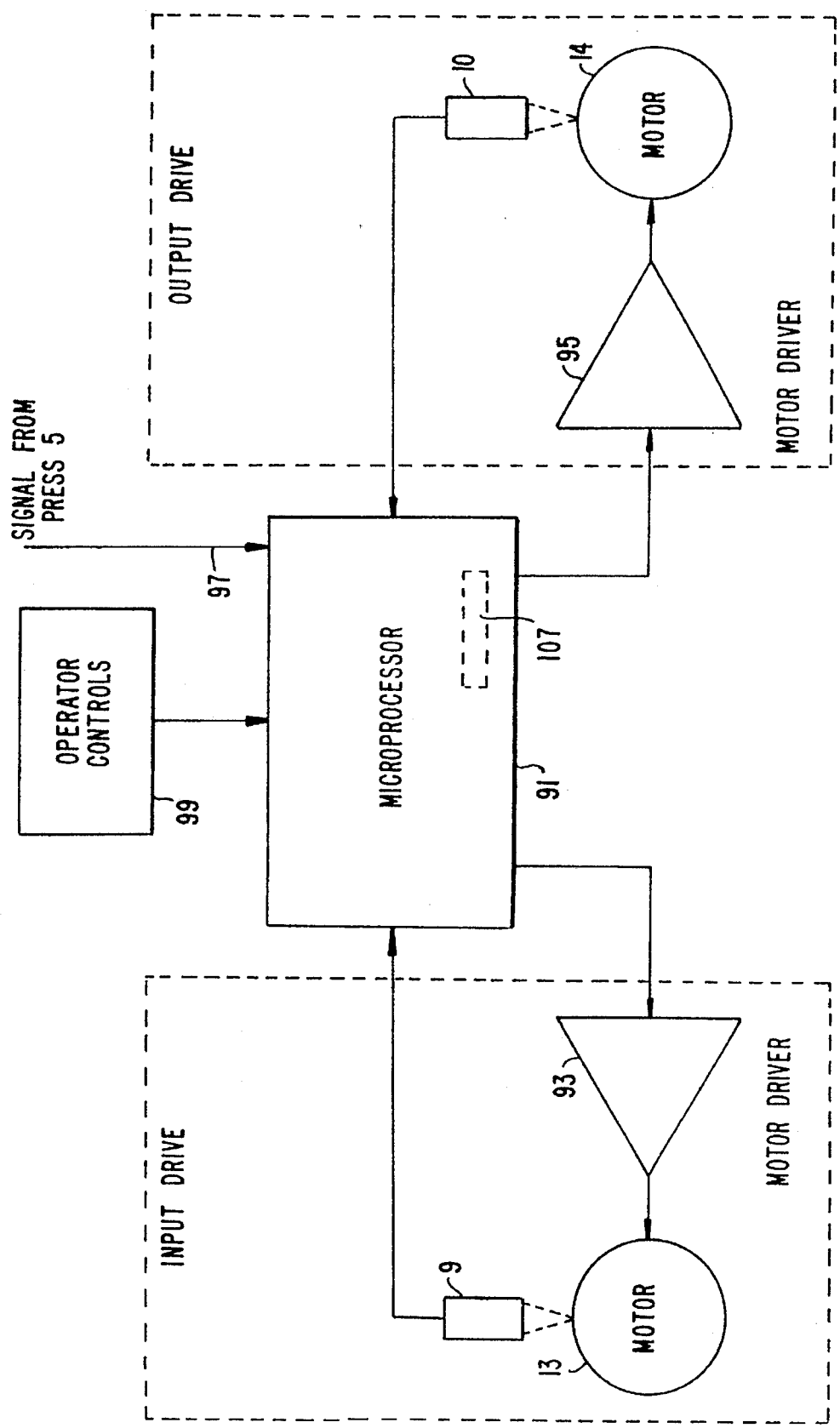
FIG. 4 is a system control block diagram of the hot stamping machines of FIGS. 2, 3(a), 3(b) or 3(c)

Any of the systems described above are made to be automatic by use of an electronic control system. Such a system is generally illustrated in FIG. 4 for the drive system of FIG. 2, a similar electronic system being employed with each of the drive systems of FIGS. 3(a), 3(b) and 3(c). A microprocessor based electronic control system 91 controls each of the input drive motor 13 and output drive motor 14 through respective amplifiers 93 and 95. The control system 91 receives an electrical output of each of the input detector 9 and output detector 10. A circuit 97 carries a signal from the hot stamp press 5 that is used by the control system 91 to initiate a routine to drive the motors 13 and 14 that advances the foil through the press 5. A set of operator controls 99 also provides signals to the controller 91 in order to manually initiate the foil advance routine and to adjust some of its parameters.

Figure 5:
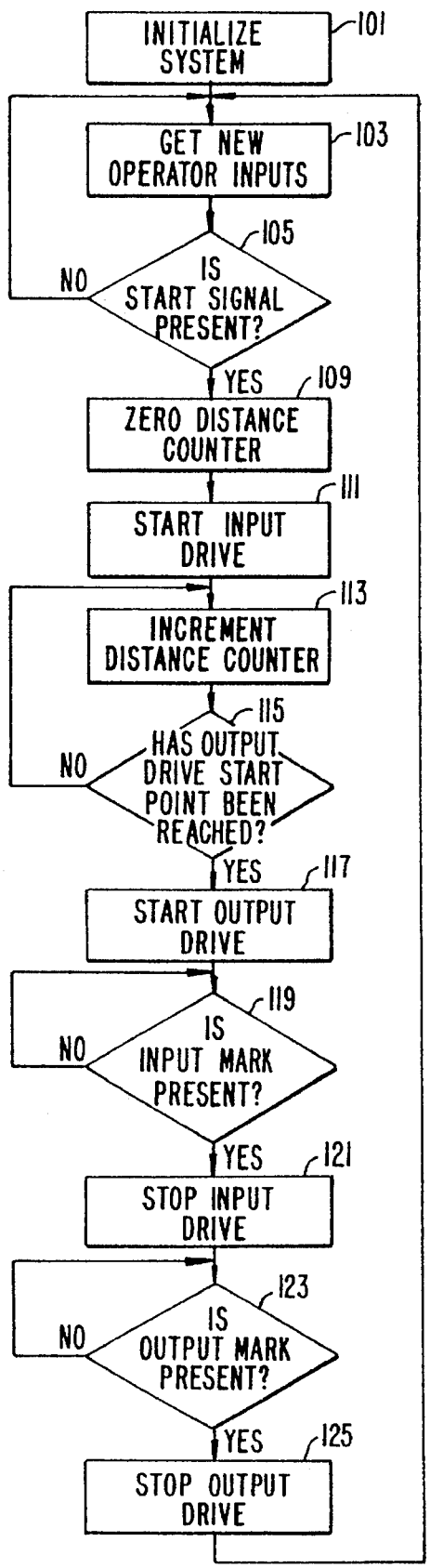
FIG. 5 is a flow chart showing a preferred method of operating the hot stamping machines of any of FIGS. 2, 3(a) and 3(c).

One such foil advance routine, described above in general terms, is illustrated by the flow chart of FIG. 5. After the foil advancing system, taking the example of FIGS. 2 and 4, is initialized in a step 101, the controller 91 watches for any change operator input, in a step 103, from the operator controls 99 (FIG. 4). Once a start signal is received, either a manual one from the operator controls 99 or one in the circuit 97 from the press 5, the controller 91 ceases watching for new operator inputs, as indicated by block 105. Instead, a counter 107 of the control system 91 is set to 0, as indicated by step 109, and a signal then sent to start the input drive motor 13, as indicated by a step 111. A step 113 shows that the distance counter 107 is then incremented. When a certain count is reached, as indicated by a step 115, a step 117 is reached wherein the output drive motor 14 is started. The use of the distance counter provides for a delay between the start of the input drive motor 13 and the output drive motor 14. This releases the tension on the foil between the input and output drives for a time. Both of the input and output drive rollers 2 and 7 are engaging and moving the foil at their respective locations while the portion of the foil between them is slack.

A step 119 shows that the control system 91 looks for a registration mark from the input drive detector 9 and, when detected, the input drive motor 13 is stopped as indicated by the next step 121. Similarly, for the output drive system, a step 123 shows the output detector 10 looking for a proper registration mark, and, when found, the output drive motor 14 is stopped, as indicated by a step 125. Once the input drive motor 13 is stopped, of course, the continued operation of the output drive motor 14 takes up the slack in the foil between the input and output drive systems. The output drive motor 14 then causes the foil to be placed in the exact amount of tension required for registering a successive plurality of its optical devices 21 with respective of the heated dies of the hot stamping press 5. This results from the monitoring of registration marks at both of the input and output drives.

The proper foil position can be determined by counting the number of registration marks which pass each of the detectors, thus stopping a respective drive motors when a number equal to the number of die is observed to have passed, this number being six in the embodiment of FIG. 2. Alternatively, for faster operation, the controller 91 can be caused to begin looking for a registration mark only after the foil has been advanced a distance slightly less than expected to reach the desired registration mark. In the latter case, the drive motor is caused to stop when its respective detector senses the first mark after that time.

Each of the alternative embodiments of FIG. 3(a) and 3(c) are also preferably operated in accordance with the method of FIG. 5. The alternate embodiment of FIG. 3(b), however, needs to be operated in a manner that both its input drive roller 63 and output drive roller 65 are stopped at substantially the same time. This is because the detectors 67 and 71 are located in a zone where the foil 1 is being stretched, rather than at locations where the foil is being held and advanced, as is the case with the embodiments of FIGS. 2, 3(a) and 3(c). If one of the drive rollers 67 or 65 stops significantly before the other, there can be some registration error since the pull of the output drive will modify the already established position of the input drive.

Although the various aspects of the present invention have been described with respect to preferred embodiments thereof, it will be understood that the invention is entitled to protection within the full scope of the appended claims.

It is claimed:

1. A method of moving a continuous length of an elastic web in a direction along its length through a work station, said web including a plurality of positions and registration features periodically spaced along the length of the web, and said work station including a plurality of locations which are periodically spaced along a path of the movement of the web in the direction of its length, said method comprising:

choosing a distance between said plurality of positions along the length of the web, when the web is unstretched to be less than a distance between said plurality of workstation locations, advancing the web at each of two spaced apart places along its length an incremental distance in a direction along its length through said work station past two spaced apart registration feature detectors until a predetermined number of registration features passes each of the detectors, and prior to advancing the web, positioning said detectors a distance apart along the length of the web to cause the web to be stretched, when advanced within said workstation, an amount along its length that is sufficient to register at least some of said plurality of web positions with said plurality of locations within the work station.

2. A method according to claim 1 additionally comprising placing an individual die at each of said plurality of work station locations, and, after advancing the web through the work station and registering said at least some of the plurality of web positions with said workstation locations, urging said dies against the web and at least one substrate.

3. A method according to claim 2 additionally comprising heating said dies.

4. A method according to claim 1 wherein the web is advanced by positioning said two spaced apart places on opposite sides of said plurality of work station locations, said web advancing being accomplished by gripping the web at said two places.

5. A method according to claim 4 including positioning said registration feature detectors adjacent said two web places, respectively.

6. A method according to claim 4 wherein the web is gripped at each of said two positions by a motor driven roller.

7. A method according to claim 4 wherein the web is advanced through said work station by first initiating an advance of a trailing one of the web places while a forward one of the web places remains stationary, followed by initiating an advance of the forward one of the web places to stretch the web within the workstation.

8. A method according to claim 1 wherein the registration features of the web used in the method include a plurality of registration marks periodically spaced along the length of the web and separate from said plurality of web positions.

9. A method according to claim 1 wherein the distance between the plurality of web positions is chosen so that said at least some of said positions which are registered with the plurality of work station locations are adjacent one another.

10. A method of incrementally advancing an elongated elastic foil through a hot stamping press of a type that simultaneously transfers from the foil onto a substrate a given number of a plurality of optical images periodically spaced along the length of the foil by urging a plurality of heated die thereagainst which are periodically spaced along a direction of the length of the foil, the foil also including a plurality of registration features periodically spaced along its length at intervals of one or more of said optical images, comprising the steps of:

choosing a spacing between the optical images carried along the length of the foil, when the foil is unstretched, to be less that a spacing between the heated die, contacting the foil on opposite sides of said press in order to advance it through the press from both sides, monitoring the registration features on the foil at at least two locations of the press that are spaced apart along the length of the foil as the foil is advanced through said press, and terminating movement of the foil through the press after one or more registration features has passed each of said at least two locations that indicates the foil has been advanced a distance therethrough and is stretched to align said given number of optical images with said plurality of heated die, whereby a new set of said given number of optical images are positioned within the press for subsequent transfer from the foil.

11. The method according to claim 10 wherein the step of terminating movement of the foil through the press includes terminating such movement after the foil has been advanced a distance through the press of exactly said given number of optical images.

12. The method according to claim 10 wherein the registration features of the web used in the method include a plurality of registration marks periodically spaced along the length of the web and separate from said plurality of optical images.

* * * * *